United States Patent
Eidelman et al.

(10) Patent No.: US 6,662,550 B2
(45) Date of Patent: Dec. 16, 2003

(54) METHOD AND APPARATUS FOR IMPROVING THE EFFICIENCY OF PULSED DETONATION ENGINES

(75) Inventors: Shmuel Eidelman, Rockville, MD (US); Dmitri Charov, deceased, late of Rockville, MD (US), by Irina Charova, executrix

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 10/131,621

(22) Filed: Apr. 25, 2002

(65) Prior Publication Data

US 2003/0200753 A1 Oct. 30, 2003

(51) Int. Cl.⁷ .................................................. F02C 3/14
(52) U.S. Cl. ............................. 60/247; 60/770; 60/205
(58) Field of Search ...................... 60/247, 770, 205, 60/208

(56) References Cited

U.S. PATENT DOCUMENTS

| | | | | |
|---|---|---|---|---|
| 2,825,202 A | * | 3/1958 | Bertin | 60/247 |
| 3,321,920 A | * | 5/1967 | Walter | 60/211 |
| 4,741,154 A | | 5/1988 | Eidelman | |
| 5,345,758 A | | 9/1994 | Bussing | |
| 5,901,550 A | | 5/1999 | Bussing et al. | |
| 6,408,614 B1 | * | 6/2002 | Eizenhofer | 60/200.1 |

* cited by examiner

*Primary Examiner*—Ehud Gartenberg
(74) *Attorney, Agent, or Firm*—Banner & Witcoff, Ltd.

(57) ABSTRACT

A pulsed detonation engine having improved efficiency has a detonation chamber for receiving a detonable mixture, an igniter for igniting the detonable mixture, and an outlet for discharging detonation products. A diverging-converging nozzle is provided at the outlet of the detonation chamber. The geometry of the diverging-converging nozzle is selected to enable a relatively short nozzle to significantly improve efficiency of the pulsed detonation engine.

18 Claims, 3 Drawing Sheets

METHOD AND APPARATUS FOR IMPROVING THE EFFICIENCY OF PULSED DETONATION ENGINES

FIELD OF THE INVENTION

The present invention is directed to methods and devices for improving the efficiency of pulsed detonation engines.

DESCRIPTION OF RELATED ART

In pulsed detonation engines (PDEs), motive force is provided by combustion products that result from a detonation process. U.S. Pat. No. 5,345,758 to Bussing describes a PDE in which several detonation combustors are coupled to an air inlet and fuel source by a rotary valve. As an opening of the rotary valve moves into position over the inlet end of a combustor, air and fuel enter that combustor through a corresponding port. Continued rotation of the rotary valve eventually closes off the inlet end of the fueled combustor, and an igniter is fired to initiate detonation. A nozzle shroud coupled to the outlet end of the combustors is said to create a quasi-uniform exit flow of combustion products.

U.S. Pat. No. 5,901,550 to Bussing et al. describes a liquid fueled PDE having a plurality of detonation chambers, each of which has an inlet end with an opening for receiving a charge of air and fuel, and an outlet end for discharging combustion product gases. An inlet rotary valve located above the inlet ends of the detonation chambers cyclically opens the fuel and air-receiving openings at the inlet ends to allow a charge to enter the chamber, then seals the chamber to allow detonation of the charge. At the outlet end of the engine, a cone-shaped outlet rotary valve rotates together with the inlet rotary valve via a common motor, so that the opening and closing of the inlet- and outlet rotary valves are synchronized. A common, tapered nozzle is said to allow controlled discharge of combustion products from all combustion tubes. According to Bussing, the tapered nozzle has a cross sectional area ratio selected to match ambient pressure.

One proposal for enhancing PDE efficiency has been to attach linear constant cross section nozzles at the aft of the detonation chamber. Such nozzles typically have the same cross section as the detonation chamber and, in effect, extend the length of the detonation chamber. In general, the linear nozzle increases PDE efficiency as a function of nozzle length. The linear nozzle usually is as long as the detonation chamber and in some cases is even longer than the detonation chamber. Although linear constant cross section nozzles of such lengths can improve PDE efficiency, the relatively long nozzles reduce engine structural efficiency and make for bulky equipment that is more difficult to use or even unusable in many applications.

Diverging nozzles have been added to the ends of combustion chambers in conventional rocket engines to improve efficiency. The combustion products expand in the diverging nozzles to ambient atmospheric conditions, which provides additional thrust. However, conventional expanding nozzles are not suitable for PDEs because detonation products tend to over-expand, resulting in a negative impulse that reduces the thrust produced by the engine.

It would be desirable to improve the efficiency of pulsed detonation engines (PDEs) operating in air or other atmospheric environments. It would be particularly desirable to improve PDE efficiency without the need for using excessively long nozzles or otherwise reducing the structural efficiency of the pulsed detonation engine.

SUMMARY OF THE INVENTION

The present invention is directed to a method of improving the efficiency of a pulsed detonation engine and to a pulsed detonation engine having improved efficiency. The pulsed detonation engine comprises a detonation chamber for receiving a detonable mixture, an igniter for igniting the detonable mixture, and an outlet for discharging detonation products. A diverging-converging nozzle of predetermined geometric configuration is provided at the outlet of the detonation chamber. The nozzle has a diverging portion having a maximum diameter greater than the width of the detonation chamber, and a converging portion having a minimum diameter less than the maximum diameter.

The pulsed detonation engines of the present invention are capable yielding performance gains comparable to or greater than those obtained with linear nozzles, while advantageously permitting the use of a shorter and more compact device. The diverging-converging nozzles of the present invention, in some cases, can more than double the efficiency of a pulsed detonation engine, leading to substantial fuel and weight savings. The length of the diverging-converging nozzle of the present invention can be 50% or less of the length of a linear nozzle that would be required to yield comparable performance gains. The enhanced performance gain, together with the ability to use shorter and more compact nozzle designs, enhances the overall structural efficiency of PDEs.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

The efficiency of a pulsed detonation engine (PDE) is improved though the use of a diverging-converging nozzle of predetermined geometric configuration. The pulsed detonation engine comprises a detonation chamber for receiving a detonable mixture, an igniter for igniting the detonable mixture, and an outlet for discharging detonation products. The diverging-converging nozzle, which can be made relatively short in length, enhances the performance and efficiency of the pulsed detonation engine. The present invention is particularly useful for PDEs operating in air or other atmospheric environments.

Figure 1:
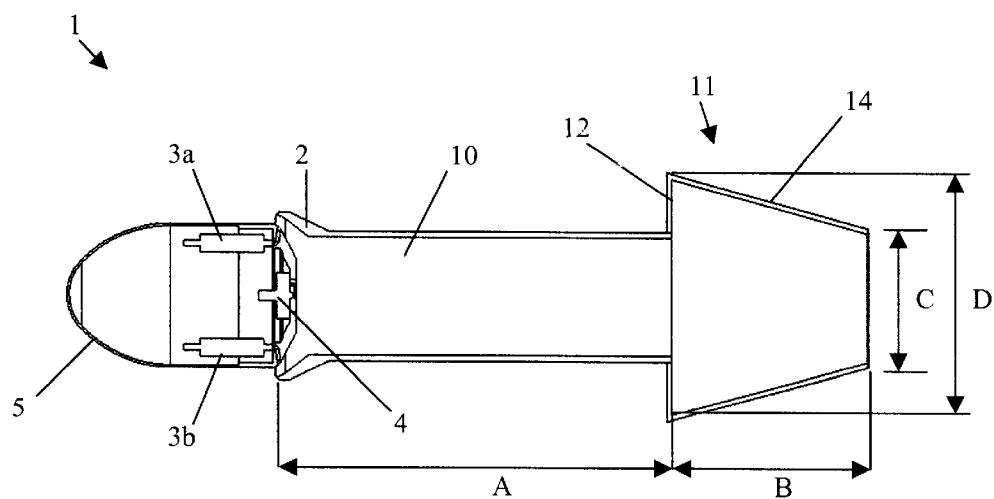
FIG. 1 is a cross-sectional illustration of a PDE including an engine forebody, inlets for air intake, fuel valves, engine ignition system, detonation chamber, and a conical diverging/converging nozzle attached to a cylindrical detonation chamber in accordance with one embodiment of the invention.

With reference to a preferred embodiment of the invention as illustrated in FIG. 1, a pulsed detonation engine I has an engine forebody 5, a detonation chamber 10, and a converging diverging nozzle 11. A set of electronically controlled fuel valves 3a, 3b within the forebody 5 are provided for controlling flow of fuel injected into a flow of air, which is provided via one or more air inlets 2. The fuel and air form a detonable mixture that fills the detonation chamber 10. A suitable igniter 4, such as a spark plug, laser, pyrotechnic device, etc., is provided in the detonation chamber 10 to ignite the detonable fuel/air mixture, producing detonation products. The detonation reaction produces a brief period of extremely high temperature and high pressure inside the detonation chamber 10. Typical detonation temperatures are on the order of 4000 K and pressures on the order of 20–40 atmospheres.

In the embodiment illustrated in FIG. 1, the pulsed detonation engine 1 comprises a generally cylindrical detonation chamber 10 having a length A of 10 cm and a diameter (width) of 2.5 cm. A generally conical, diverging-converging nozzle 11 is attached at the aft of the detonation chamber 10. The nozzle 11 has a diverging portion 12 having a maximum diameter D which is greater than the diameter of the detonation chamber 10, and a converging portion. 14 tapering to a minimum diameter C equal to the diameter of the detonation chamber 10. The diverging converging nozzle 11 illustrated in FIG. 1 has a maximum diameter D of 4.4 cm and a minimum diameter C of 2.5 cm. Although the diverging-converging nozzle 11 illustrated in FIG. 1 has a length B of only 4.4 cm, the nozzle 11 yields comparable performance efficiency gains as would be realized by a 10 cm extension of the detonation chamber 10.

The particular dimensions of the diverging-converging nozzle 11 may vary over a wide range depending on such factors as the dimensions of the detonation chamber 10 and the properties of the detonation products (e.g., particle size, velocity, etc.). The diverging-converging nozzle 11 usually has a length B that is less than about 60% of the length of the detonation chamber A and preferably has a length that is less than about 50% of the length of the detonation chamber A.

Figure 2:
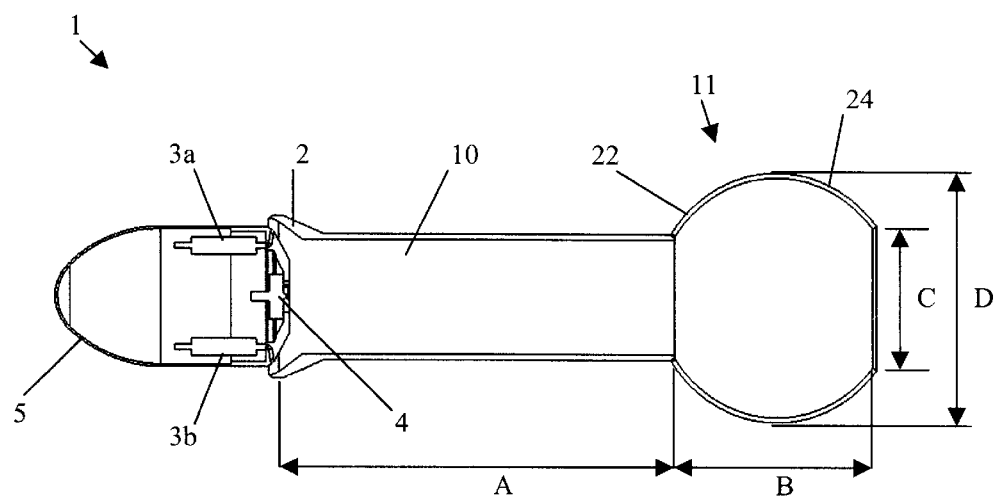
FIG. 2 is a cross-sectional illustration of a PDE having a spherical diverging/converging nozzle attached to a cylindrical detonation chamber in accordance with another embodiment of the invention.

The diverging-converging nozzle 11 should have a geometric shape capable of controllably expanding and accelerating the detonation products, e.g., without creating a negative impulse. In preferred geometries, cross-sections of the nozzle taken through planes perpendicular to the plane illustrated in FIGS. 1–3 are circular, so that for any such cross-section, points along the internal surfaces of the nozzle 11 are equidistant from the longitudinal axis of the nozzle 11. The term "diameter" as used herein refers to the diameter of such a circular cross-section, as well as to the minimum width or maximum width of a non-circular cross-section, in the context of minimum diameter and maximum diameter, respectively.

In general, the nozzle 11 has maximum diameter D (diverging portion) that is greater than the width of the detonation chamber, and a minimum diameter C (converging portion) about equal to the diameter of the detonation chamber. Non-limiting examples of suitable geometric shapes for the diverging-converging nozzle are illustrated in FIGS. 1–3.

FIG. 2 illustrates another embodiment of the present invention, in which a generally spherical diverging-converging nozzle 11 is employed. The detonation products discharged from the detonation chamber 10 first expand into the diverging portion 22 of the nozzle, then are accelerated though the converging portion 24 of the nozzle 11. As in the embodiment of FIG. 1, the generally cylindrical detonation chamber 10 illustrated in FIG. 2 has a length A of 10 cm and a diameter of 2.5 cm. The nozzle 11 has a maximum diameter D of 4.4 cm, a minimum diameter C of 2.5 cm, and an overall length B of 4.4 cm. The device illustrated in FIG. 2 exhibits comparable increased performance as would be realized by a device having a 10 cm linear extension of the detonation chamber 10.

Figure 3A:
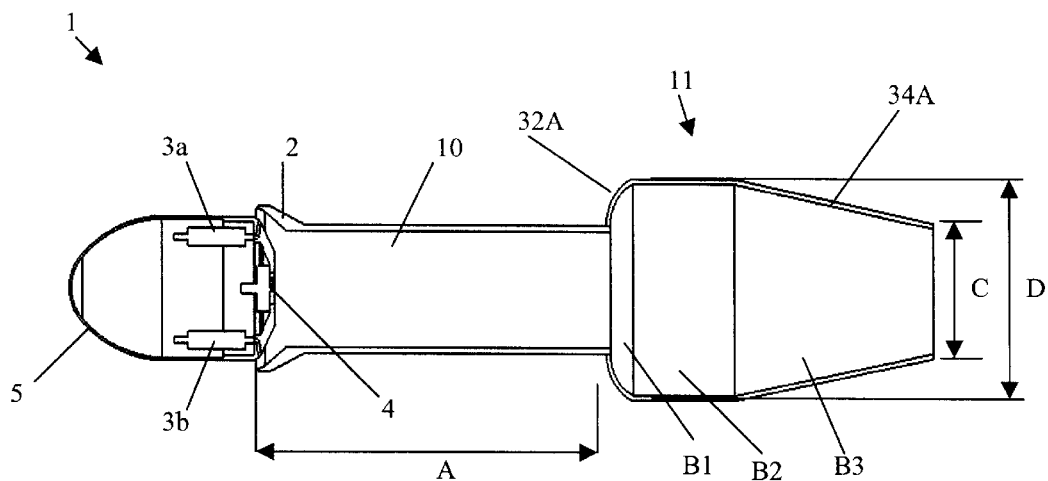
FIGS. 3A–3C illustrate cross-sections for alternative geometry diverging/converging nozzles attached to cylindrical detonation chambers in accordance with alternative embodiments of the present invention.
Figure 3B:
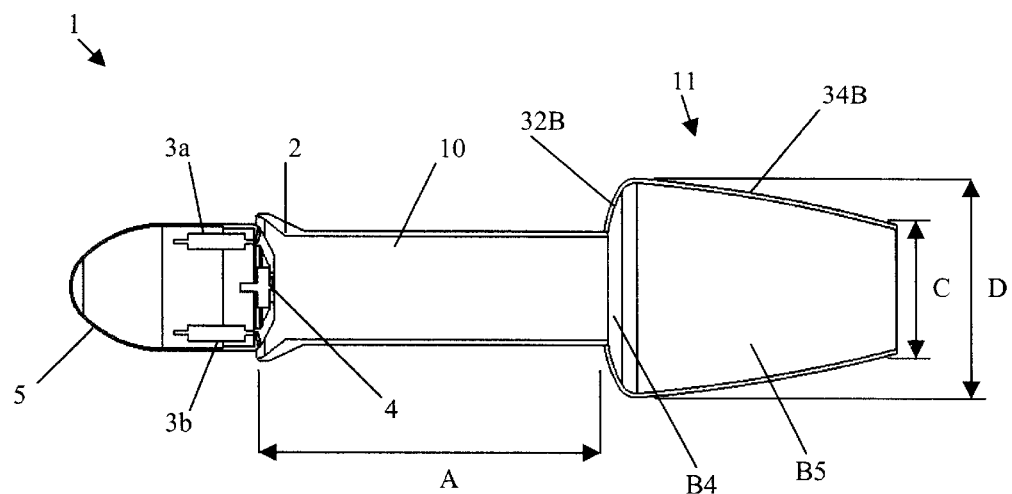
Figure 3C:
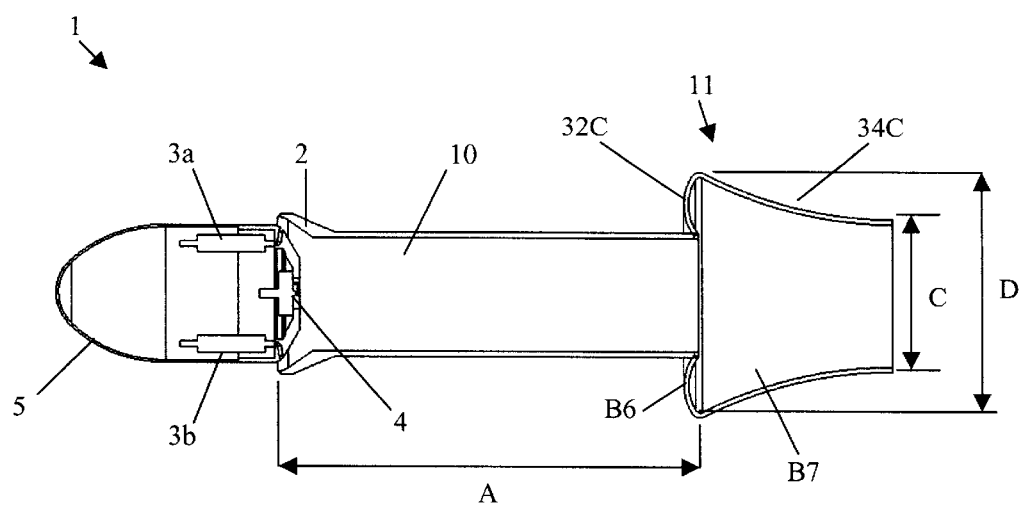

FIGS. 3A–3C illustrate alternative configurations for diverging-converging nozzles 11. As demonstrated by FIGS. 3A–3C, more complex geometric shapes also may be used to enhance PDE performance in accordance with the present invention. For each configuration, detonation products are discharged from the generally cylindrical detonation chamber 10 and first expand into the diverging portions 32A, 32B, 32C of the respective nozzles 11. The detonation products then are accelerated through the converging portions 34A, 34B, 34C and discharged from the respective nozzles 11.

The diverging-converging nozzle 11 shown in FIG. 3A includes first B1, second B2, and third B3 geometric portions, which are separated by vertical lines in FIG. 3A for purposes of illustration. The first portion B1 extends from the aft of the detonation chamber 10. As shown in FIG. 3A, the cross-section of first portion B1 is curvilinear, beginning at about a right angle with respect to the longitudinal axis of the detonation chamber 10 and ending at an angle that is parallel to the longitudinal axis of the detonation chamber 10. The end of the first portion B1 defines the maximum diameter D of the nozzle 11. The second portion B2 of constant diameter (equal to the maximum diameter D) extends from the end of the first portion B1. The third portion B3, which extends from the end of the second portion B2, is generally conical and tapers from the maximum diameter D to a minimum diameter C.

The diverging-converging nozzle 11 illustrated in FIG. 3B has a horseshoe-shaped cross-section. The nozzle 11 includes a first portion B4 extending from the detonation chamber 10. As shown in FIG. 3B, the cross-section of first portion B4 is curvilinear, beginning at an obtuse angle with respect to the longitudinal axis of the detonation chamber 10 and ending at an angle that is parallel to the longitudinal axis of the detonation chamber 10. The vertical lines inside of the nozzle 11 of FIG. 3B are used to illustrate the changes in geometry. Within the first portion B4, the region closest to the detonation chamber 10 is less curved, while the region adjacent to the second portion B5 is more curved. The end of the first portion B4 defines the maximum diameter D of the nozzle 11. A second portion B5 gradually curves from the end of the first portion B4 and tapers to a minimum diameter C.

The diverging-converging nozzle 11 of FIG. 3C includes a first portion B6 that extends from the detonation chamber 10. The end of the first portion B6 defines the maximum diameter D of the nozzle 11. The cross-section of the first portion B6 is curvilinear, beginning at an acute angle with respect to the longitudinal axis of the detonation chamber 10 and ending at an orientation that is parallel to the longitudinal axis of the detonation chamber 10. A second, curvilinear portion B7 extends from the end of the first portion B6 and gradually tapers to a minimum diameter C.

A wide variety of fuels can be used with the PDE of the present invention. Examples include fuels detonable in mixtures with air such as hydrogen, methane, propane, acetylene, or propylene. Also, detonable mixtures of liquid fuels and air can be used, e.g., kerosene/air, alcohol/air, benzene/air and other similar mixtures. Detonable mono-propellants also can be used, such as nitromethane, nitroglycerin, or similar single-component fuels. Other useful fuels include aluminum (solid or vapor), magnesium (solid or vapor), carbon and boron. Although boron has ideal energy content, boron particles produced by a gas generator are usually coated with an oxide layer that must be removed before the boron will ignite.

A fuel-rich gas based on aluminum can be generated without an oxide layer. The aluminum particle size should be kept below 10 microns to maintain a sustained detonation. Aluminum can also be generated as a vapor, which will further enhance its detonability. Magnesium can be generated as a solid or vapor suspension, and can be detonated. The magnesium particles or droplets should be approximately 10 microns or less to detonate. Both aluminum and magnesium vapor suspensions have very favorable detonation properties. However, an undesirable property of the vapor suspensions is their tendency to condense on cold surfaces because of the relatively high melting points of the two metals. Condensation of aluminum and magnesium vapor can cause mechanical problems if it occurs on tightly fitting parts with small gap tolerances. Alternatively, the system could be heated by designing a gas generator fuel grain that first produces hot gas followed by the fuel-rich gases.

To ensure the optimum condition for fuel-air detonation, the fuel and air should be thoroughly mixed to ensure the fuel concentration is within the detonability limit (i.e., near stoichiometric). The components should be mixed to length scales comparable to the detonation phenomena length scales.

Mixing can be characterized on several levels including macroscopic and microscopic scales. Macroscopic mixing refers to the bulk fluid processes, which bring the fuel and air components to close proximity (e.g., impingement of fuel and air streams). Microscopic mixing is the process by which the fuel and air are further mixed to a length scale required for detonation. Many techniques can be employed to produce microscopic mixing. However, care should be taken to minimize total pressure losses associated with these devices.

One mixing strategy involves mixing the fuel and air in a separate pre-mixer before injection of the fuel and air into the detonative combustors. A primary problem related to pre-mixing is the potential of pre-ignition due to inadequate isolation of the mechanical elements of the engine. One variation of this strategy is to partially pre-mix the fuel and air to a fuel concentration level just outside the fuel-air mixture's detonability limits.

Materials for construction of the engine should be selected dependent on anticipated operating conditions. It is expected that the engine material could be exposed to peak temperatures approaching 4000 K and peak pressures of the order of about 20–40 atmospheres. Pressures just behind the detonation wave's shock front (i.e., in the ignition delay region) typically are of the order of about 40 atmospheres, and pressure ratios across the entire detonation region typically are of the order of about 20 atmospheres. The mode of operation will also expose the structure to periodic variations of both a thermal and a mechanical nature.

Components made from carbon/carbon or titanium/zirconium/molybdenum (or similar alloy), both commercially available, may be used in construction of the PDE. For example, the detonation chamber and diverging-converging nozzle can each be manufactured from a carbon/carbon composite, optionally as a monolithic unit. Carbon/carbon can be machined to tolerances that produce surface finishes approaching the smoothness of machined metal. Carbon/carbon has a very low thermal expansion coefficient and will allow the components of the engine to be assembled to very close tolerances, thus minimizing potential sealing problems. Titanium/zirconium/molybdenum materials offer high temperature capability and are easily machined.

Several methods for initiating a detonation cycle may be used. Detonation may be initiated by igniting a fuel-oxygen mixture in a small detonation tube (not illustrated) that discharges into a detonation chamber 10, or by igniting a fuel-oxygen mixture collocated within the detonation chamber 10. Alternatively, a high voltage electric discharge or pyrotechnic igniter can be used. The small detonation tube method generally requires fuel, an oxidizer, pumps, high-speed fluid valves, an electronic controller, a power supply and a spark generator. The direct electric discharge method generally requires a spark plug, an electronic controller and a power supply. Pyrotechnic ignition involves a small solid rocket being fired systematically into the detonation chamber (e.g., through a small rotor or cylinder valve) to initiate detonation.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for improving the efficiency of a pulsed detonation engine having a detonation chamber for receiving a detonable mixture, an igniter for igniting the detonable mixture, and a detonation chamber outlet for discharging detonation products, wherein said detonation chamber has a longitudinal axis, a length, and a width, the method comprising providing a diverging-converging nozzle of predetermined geometric configuration at said detonation chamber outlet, wherein said nozzle comprises a diverging portion having a maximum diameter greater than said detonation chamber width and a converging portion having a minimum diameter less than said maximum diameter.

2. The method of claim 1 wherein said detonation chamber is generally cylindrical.

3. The method of claim 2 wherein said diverging-converging nozzle is generally conical.

4. The method of claim 2 wherein said diverging-converging nozzle is generally spherical.

5. A pulsed detonation engine comprising a detonation chamber for receiving a detonable mixture, said detonation chamber comprising an igniter for initiating said detonable mixture and a detonation chamber outlet for discharging detonation products, wherein said detonation chamber has a longitudinal axis, a length, and a width; the pulsed detonation engine further comprising a diverging-converging nozzle of predetermined geometric configuration at said detonation chamber outlet, wherein said nozzle comprises a diverging portion having a maximum diameter greater than said detonation chamber width and a converging portion having a diameter less than said maximum diameter.

6. The pulsed detonation engine of claim 5 wherein said detonation chamber is generally cylindrical.

7. The pulsed detonation engine of claim 6 wherein said diverging-converging nozzle is generally conical.

8. The pulsed detonation engine of claim 6 wherein said diverging-converging nozzle is generally spherical.

9. The pulsed detonation engine of claim 6 wherein said diverging-converging nozzle comprises: (i) a first, curvilinear portion extending from the detonation chamber, initially at about a right angle with respect to the longitudinal axis of the detonation chamber and ending at an angle about parallel to the longitudinal axis of the detonation chamber, wherein the end of said first portion defines said maximum diameter; (ii) a second portion extending from the end of the first portion, wherein said second portion has about a constant diameter; and (iii) a third, generally conical portion extending from said second portion and tapering to a minimum diameter.

10. The pulsed detonation engine of claim 6 wherein said diverging-converging nozzle comprises: (i) a first, curvilinear portion extending from the detonation chamber, initially at an obtuse angle with respect to the longitudinal axis of the detonation chamber and ending at an angle about parallel to the longitudinal axis of the detonation chamber, wherein the end of said first portion defines said maximum diameter; (ii) a second, curvilinear portion extending from said end of said first portion and gradually tapering to a minimum diameter.

11. The pulsed detonation engine of claim 6 wherein said diverging-converging nozzle comprises: (i) a first, curvilinear portion extending from the detonation chamber, initially at an acute angle with respect to the longitudinal axis of the detonation chamber and ending at an angle about parallel to the longitudinal axis of the detonation chamber, wherein the end of said first portion defines said maximum diameter; (ii) a second, curvilinear portion extending from the end of the first portion and gradually tapering to a minimum diameter.

12. A diverging-converging nozzle having a predetermined geometric configuration and adapted for attachment to a detonation chamber of a pulsed detonation engine, wherein said detonation chamber has a longitudinal axis, a length, and a width, the diverging-converging nozzle comprising a diverging portion having a maximum diameter greater than said detonation chamber width and a converging portion having a diameter less than said maximum diameter.

13. The diverging-converging nozzle of claim 12 wherein said detonation chamber is generally cylindrical.

14. The diverging-converging nozzle of claim 13 wherein said diverging-converging nozzle is generally conical.

15. The diverging-converging nozzle of claim 13 wherein said diverging-converging nozzle is generally spherical.

16. The diverging-converging nozzle of claim 13 wherein said diverging-converging nozzle comprises: (i) a first, curvilinear portion extending from the detonation chamber, initially at about a right angle with respect to the longitudinal axis of the detonation chamber and ending at an angle about parallel to the longitudinal axis of the detonation chamber, wherein the end of said first portion defines said maximum diameter; (ii) a second portion extending from the end of the first portion, wherein said second portion has about a constant diameter; and (iii) a third, generally conical portion extending from said second portion and tapering to a minimum diameter.

17. The diverging-converging nozzle of claim 13 wherein said diverging-converging nozzle comprises: (i) a first, curvilinear portion extending from the detonation chamber, initially at an obtuse angle with respect to the longitudinal axis of the detonation chamber and ending at an angle about parallel to the longitudinal axis of the detonation chamber, wherein the end of said first portion defines said maximum diameter; (ii) a second, curvilinear portion extending from said end of said first portion and gradually tapering to a minimum diameter.

18. The diverging-converging nozzle of claim 13 wherein said diverging-converging nozzle comprises: (i) a first, curvilinear portion extending from the detonation chamber, initially at an acute angle with respect to the longitudinal axis of the detonation chamber and ending at an angle about parallel to the longitudinal axis of the detonation chamber, wherein the end of said first portion defines said maximum diameter; (ii) a second, curvilinear portion extending from the end of the first portion and gradually tapering to a minimum diameter.

* * * * *